March 4, 1952     B. FOX     2,587,610
DIRECTIONAL RADAR SYSTEM
Filed March 13, 1944     2 SHEETS—SHEET 1

*INVENTOR.*
BENJAMIN FOX
BY
*William D. Hall.*
ATTORNEY.

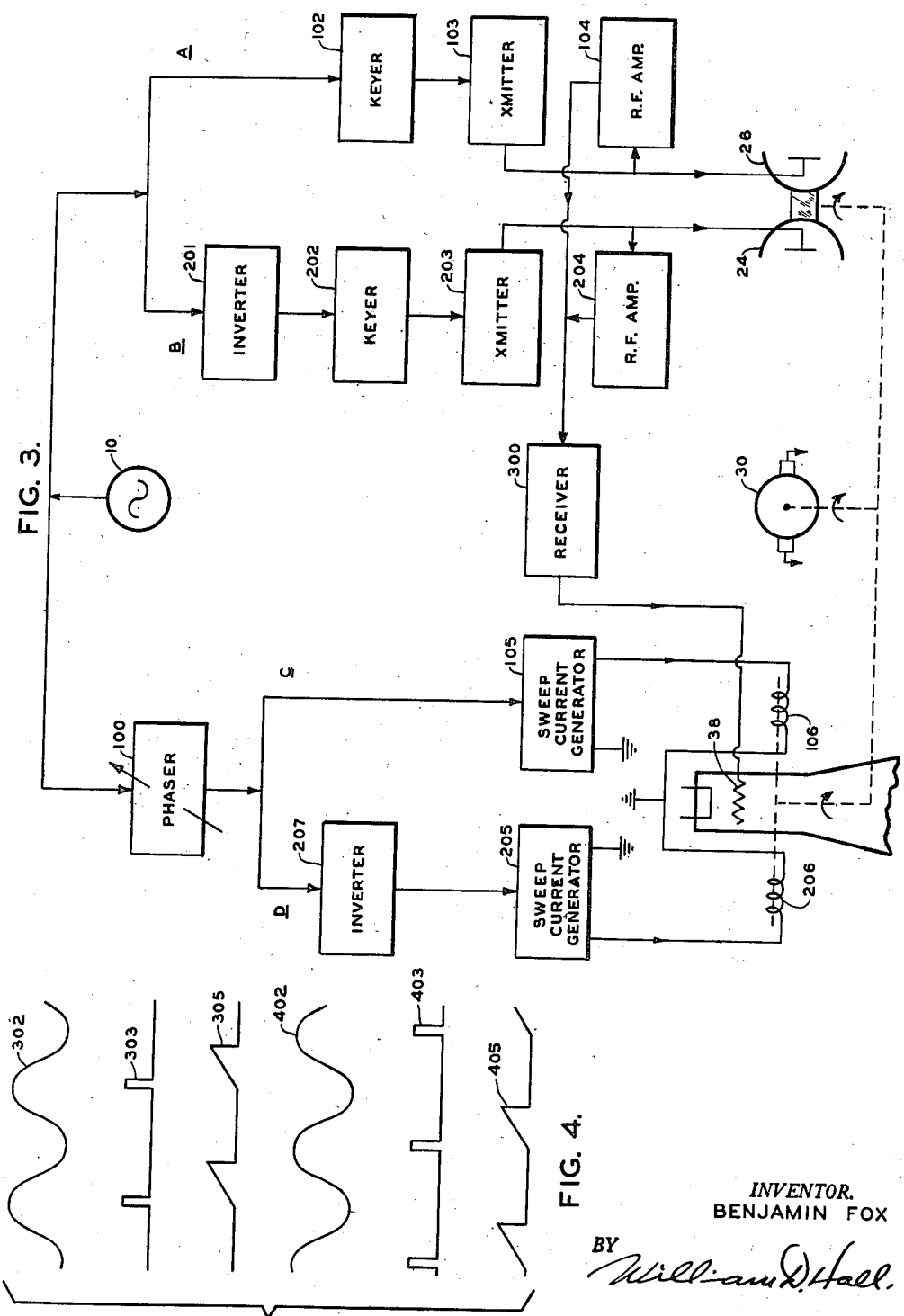

Patented Mar. 4, 1952

2,587,610

UNITED STATES PATENT OFFICE 2,587,610

DIRECTIONAL RADAR SYSTEM

Benjamin Fox, Belmar, N. J., assignor to United States of America as represented by the Secretary of War Application March 13, 1944, Serial No. 526,304

12 Claims. (Cl. 343—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to object location means and methods. More particularly, it relates to pulse-echo object location systems of the type in which a composite, or dual coordinate, indication of both the distance and direction of a body in space is obtained. Such indication can be obtained in terms of rectangular or polar coordinates. Indicators of the latter type are usually designated Plan Position Indicators. Systems using such indicators will be hereinafter referred to as P. P. I. systems.

Such methods of object location involve the use of a continuously rotating antenna having a relatively narrow unidirectional response lobe (generally less than ten degrees) along which pulses of wave energy, or wave trains, are intermittently transmitted. A saw-tooth wave, initiated concurrently with the transmission of each pulse, is used to deflect the beam of an oscilloscope along one coordinate. At the same time the beam is deflected along a second coordinate in synchronism with the rotation of the antenna. Any object scanned by the antenna lobe will send back an echo which will be received and used to vary the intensity of the oscilloscope beam. The position of the resulting spot along one coordinate of the fluorescent screen of said oscilloscope is a measure of the distance of said body, while the position of the spot along the second coordinate is a measure of the azimuth of said body. In the case of the P. P. I. system, distance is indicated by the radial distance of the spot from the center of the oscilloscope screen, and the azimuth is indicated by the radial angle of said spot.

Since the antenna is continuously moving, it is necessary to use relatively high-persistence screens in order to facilitate observation and measurement of signals from bodies which are momentarily not being scanned by the antenna lobe. The lower the speed of antenna rotation, the greater the screen persistence necessary. To provide continuous indication of all incoming echoes, it is necessary to make the persistence of said screen at least as long as the period of antenna rotation.

Because of the size and weight of the highly directive antenna often used, it is impractical to provide for antenna rotation speeds higher than ten to twenty revolutions per minute. In practice such antennas are driven at a rate of 2–10 R. P. M. Although it is possible to provide fluorescent screens having sufficiently high persistence to provide substantially continuous image persistence at such low speeds, the use of such long persistence screens has many disadvantages. Such screens retain interfering signals and noise currents as long as the desired signals with the result that it is continuously covered with bright areas which hinder the reading of the desired signals. Another disadvantage resides in the fact that they do not provide very good resolution of closely adjacent images. Powerful closely succeeding echoes build up bright and glaring screen images. which tend to merge into each other and thus appear as one image.

Another problem connected with continuous scanning systems arises when systems are used for limited sector scanning. Along seacoast or harbor areas, or in the vicinity of mountain ranges, it is not often necessary or desirable to provide scanning over a range of 360 degrees. To increase effective scanning speed, it has been the practice heretofore to provide automatic antenna reversing means so that the antenna scans back and forth over the desired sector. Where large antennas are used, such continuous reversal results in considerable strain on the drive mechanism.

It is a principal object of my invention to increase the effective scanning speed of an antenna system having a directional pattern which is continuously shifted.

It is a further object of this invention to make possible the use of lower persistence oscilloscope screens without necessitating corresponding increase in the speed of antenna rotation. Alternatively, it is possible to reduce the antenna rotation speed without necessitating a corresponding increase in the screen persistence.

It is a further object of the invention to increase the effective speed of limited sector scanning without the necessity of continuously reversing the antenna drive gear.

These objects are attained by the use of a plurality of equi-angularly spaced directional antennas which are successively energized, and means to simultaneously shift the instantaneous direction of the radial deflection of the oscilloscope beam so that it always corresponds to the lobe direction of the antenna which is being energized. Each antenna will scan a given object once during each rotation. Hence, the effective scanning speed will be equal to the number of antennas multiplied by the speed of antenna rotation. In this respect the present invention is a further extension of the invention disclosed and claimed in applicant's copending application, Serial No. 503,033, filed September 20, 1943, particularly Fig. 5 thereof.

For a better understanding of the invention, together with other and further objects thereof, reference is had to the following description taken in connection with the accompanying drawings, wherein like parts are indicated by like reference numerals, and its scope will be pointed out in the accompanying claims.

In the accompanying drawings,

Figure 3 is a schematic diagram of an alternative form of my invention; and

Figure 4 is a series of wave forms illustrating the operation of certain components in Figure 3.

Figure 1:
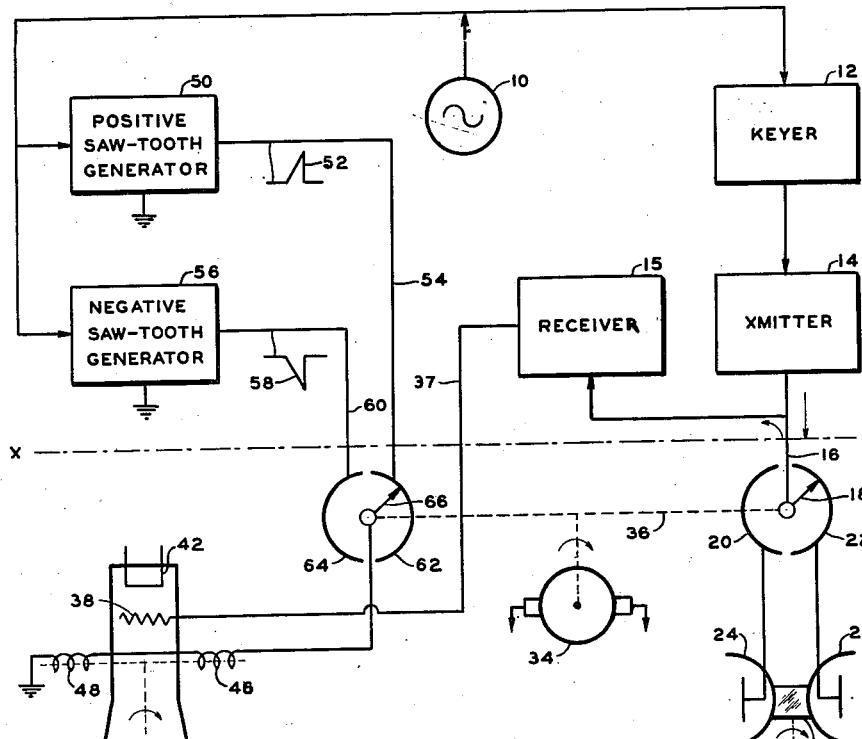
Figure 1 is a schematic diagram of one aspect of my invention.

Referring to Figure 1, there is shown a radio frequency transmitter 14 which is normally non-oscillating due to a high negative blocking voltage on its grid or insufficient plate voltage, or both. The transmitter is rendered intermittently operative by means of positive pulses applied to the grid or plate, or both, from a keyer-modulator 12, which is in turn controlled by a sine wave synchronizing oscillator 10 of relatively low frequency, generally in the audio region.

The output of the transmitter together with the input of a receiver 15 are adapted to be coupled through a transmission line 16 and a rotatable switch contact 18 cooperating with stationary semicircular contacts 20 and 22, to one or the other of a pair of antennas 24 and 26, each of which has a narrow unidirectional response lobe and may be of the parabolic reflector type, as shown, or of the multiple dipole array type of conventional design. Both antennas are mounted on a common rotatable support 28 in back-to-back relation, i. e., said antennas have oppositely directed response lobes. A duplexing or receiver protection network of conventional design (not shown) is usually inserted between the transmitter and receiver to protect the latter from the powerful transmitted pulses.

The output of receiver 15 is impressed through a lead 37 upon the intensity grid 38 of a cathode-ray oscilloscope 40, having a cathode 42, a fluorescent screen 44, rotatable beam deflecting magnet coils 46 and 48, in addition to the usual beam focusing and centering means, not shown. Said deflecting magnet coils are adapted to be rotated about the axis of the beam in synchronism with antennas 24 and 26 by means of a motor 30, through a mechanical or electromechanical coupling of the Selsyn type, as indicated by dotted line 32.

Intensity grid 38 may be normally biased so that the beam is cut off and the signal from receiver 15 may be made sufficiently positive to overcome said bias, whereby said signal will be indicated by a bright spot or arc 70 on screen 44. Or said grid may be biased so that the beam normally impinges on the screen and the signal from the receiver made sufficiently negative to decrease the brightness or entirely cut off such beam, whereby the signal is indicated by a dark spot on a normally bright screen.

Deflection coils 46 and 48 are adapted to be alternately energized by positive and negative saw-tooth currents of equal magnitude and duration derived from saw-tooth current generators 50 and 56, controlled by synchronizing oscillator 10. By means well known, every sine wave cycle of oscillator 10 causes the generation of positive and negative saw-tooth waves, such as indicated at 52 and 58, which are fed through leads 54 and 60 to semicircular switch contacts 62 and 64. A rotating contact 66 alternately engages said semicircular switch contacts and alternately feeds positive and negative saw-tooth current to the deflecting magnets. Rotary contacts 18 and 66 are adapted to be driven in unison by a motor 34, as indicated by dotted line 36.

Referring now to the operation of the above described system, let it be assumed that motors 30 and 34 are not running, so that the switch contacts 18 and 66 are in the positions shown, and the antenna tower 28 and deflecting magnets 46 and 48 are stationary. The beam of the cathode-ray tube is so focused that it would normally impinge on the exact center of the screen. The intensity grid 38 is normally biased to cutoff so that it entirely suppresses the beam.

Under the control of synchronizing oscillator 10, keyer 12 will generate at each cycle of oscillator 10 a pulse of high voltage of very short duration, spaced at intervals of considerably longer duration. These pulses will render transmitter 14 operative to generate a series of intermittent wave trains which are transmitted through switch contacts 18 and 22 and antenna 26 toward an object to be located. Upon striking said object, said wave trains will be reflected or reradiated back toward the antenna. The intervals between said wave trains will be determined by the maximum echo distances which the system is designed to measure and the propagation speed of the medium, generally about ten microseconds per mile for radio waves.

Under the control of synchronizing oscillator 10, sweep generator 50 generates a saw-tooth sweep current, such as shown at 52, which is initiated at the instant that a wave train is transmitted from the antenna. The saw-tooth current is impressed, through switch contacts 62 and 66, upon beam deflecting magnets 46 and 48, which in turn generate a magnetic beam deflecting field which will progressively deflect said beam from the center of the screen 44 toward its outer circumference. When an echo is impressed upon the antenna, it will be transmitted through switch contacts 18 and 22 to the input of receiver 15 which will, in turn, impress a positive pulse upon grid 38 of cathode-ray tube 40. This pulse will unblock the beam so that it will strike the screen and form an indication at some distance from the center thereof, said distance depending upon the interval between the pulse transmission and the reception of the echo.

In order to continuously scan the entire area surrounding the point of operation, motor 30 is made operative to continuously rotate antenna support 28, so as to rotate the effective direction of the antenna lobe. Said motor will at the same time rotate beam deflecting magnets 46 and 48 and thus rotate the plane of beam deflection in synchronism with the rotation of the antenna lobe direction. As a result, all echo-producing objects within the scanned area will be successively scanned by the antenna and will be indicated upon the screen of the oscilloscope, the indications being in the form of bright spots or arcs 70. The radial distance of a spot from the center of the screen is a measure of its distance from the antenna. Since the position of the deflecting magnets is such as to radially deflect the beam along the direction of the antenna lobe, the radial angle of said spot with respect to a predetermined datum direction is an indication of its azimuth.

With the exception of the rotating switches, which are not ordinarily needed for single antenna operation, the P. P. I. system as thus far described is conventional. As above pointed out, such systems require relatively long persistence oscilloscope screens to permit a minimum of antenna rotation speed.

In accordance with this invention, the speed of antenna rotation can be cut in half by alternately transmitting pulses through antennas 24 and 23 and reversing the direction of oscilloscope beam deflection in synchronism with said alternation of antennas. For this mode of operation, motor 34 is started so as to rotate switch contacts 18 and 66. Contact 18 will alternately connect transmitter 14, as well as receiver 15, to antennas 24 and 26. At the same time contact 66 will alternately reverse the polarity of the saw-tooth current applied to deflecting magnets.

At the same time both the antennas and the deflecting magnets are rotated in synchronism so that the radial direction of beam deflection always corresponds to the direction of the response lobe of the antenna which is connected to transmitter 14.

Since each antenna will scan an object in space once during each rotation, the effective scanning speed will be doubled. Hence, the persistence factor of the screen can be halved without increasing the antenna rotation speed. For the same reason, the antenna rotation speed can be halved without increasing the persistence factor of the screen.

The speed of rotation of switches 18 and 66 must be considerably greater than the speed of antenna rotation, so that for a given small increment of antenna rotation as many reversals of lobe direction and beam deflection as possible may be obtained. On the other hand the number of such reversals in any time interval should not exceed the number of pulses transmitted during said interval. Preferably, alternate pulses should be transmitted in alternate directions. For this purpose switching motor 34 can be synchronized with synchronizing oscillator 10, by means well known in the art. Such synchronous operation is, however, not essential if the pulse repetition rate is much faster than the switching rate.

Figure 2:
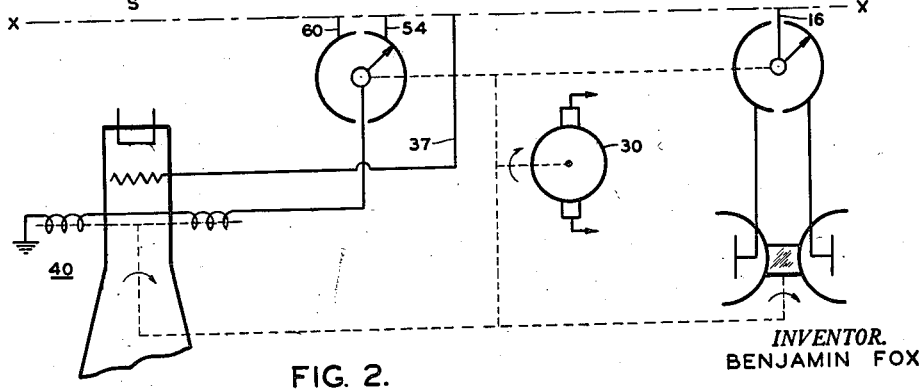
Figure 2 is a schematic diagram of another aspect of my invention.

Reference is now made to Figure 2 which illustrates the application of my invention to sector scanning. In this figure the components and circuits are the same as in Figure 1, except that the separate switching motor 34 has been eliminated. The circuit in Figure 2 is only a partial showing of the components of the entire system, the remaining components being the same as those above line X—X in Figure 1.

The only change in Figure 2 is the use of the antenna motor 30 to operate both the antenna and beam reversing switches. Hence, such reversals will occur only once during each 180 degrees rotation of the antennas. Consequently, both antennas will sequentially scan the same 180 degree sector; for as one antenna lobe is just leaving said sector, the other antenna lobe is just entering said sector. As this happens the transmitter output is switched out of said one antenna and switched into the other antenna. At the same time the polarity of the sweep current is reversed so that the radial direction of the beam deflection is reversed and therefore conforms to the lobe direction of said other antenna. Indications are therefore displayed on only the portion of the oscilloscope screen which corresponds to the 180 degree sector which is being scanned. Thus, the speed of sector scanning is doubled without necessitating continuous reversal of the direction of antenna rotation.

The system in Figure 2 is capable of several modes of operation. By rotating the antennas about a vertical axis, their lobes will progressively travel through different azimuthal planes so that indications are afforded in terms of range and azimuth. By rotating said antennas about a horizontal axis their lobes will travel through different elevational planes so that an indication is afforded in terms of range and elevation. The latter mode of operation would be especially useful for contourometer purposes in airships for providing an indication of the contour of the terrain just ahead. When traveling in mountainous country, this mode of operation would provide a safeguard against collisions with mountain peaks. Finally, by stopping the rotation of the antennas and pointing one of the antenna lobes downward, the equipment would function as a conventional pulse-echo altimeter.

In the systems described above, mechanical antenna and beam reversing switches have been shown. It is to be understood, however, that well known equivalent means can be used for this purpose, e. g. electrostatic, electromagnetic or electronic switching. Several suitable types of antenna switching arrangements that may be used, especially at higher frequencies, are disclosed in Hershberger Patent 2,189,549.

Reference is now made to Figure 3 which shows a system similar to that of Figure 1, but which eliminates the need for the antenna and beam reversal switches; their functions being accomplished entirely electronically. For this purpose two separate transmitter channels A and B, controlled by synchronizing oscillator 10 are used to alternately energize rotating back-to-back antennas 24 and 26. Oscillator 10 also controls a pair of like saw-tooth current generating channels C and D, the outputs of which are applied to rotating beam deflecting magnets 106 and 206. Said magnets are so wound that the fields generated by the steady currents normally circulating therein cancel each other so that normally they have no effect on the oscilloscope beam.

Channels A and B respectively include like keyers 102 and 202, and like transmitters 103 and 203, respectively coupled to antennas 26 and 24. Channel B has, in addition, a phase inverter 201 which inverts the phase of the sine wave input from oscillator 10.

The output of oscillator 10 is also applied to sweep current channels C and D through an adjustable phaser 100. Channel D has in addition a phase inverter 207.

Antennas 26 and 24 are also coupled to the input of receiver 300 through tuned radio frequency buffer amplifiers 104 and 204. Duplexing networks (not shown) may be inserted between the transmitters and the buffer amplifiers. The output of receiver 300 is applied to intensity grid 38 of the oscilloscope.

The operation of the above described system will now be described with reference to the curves in Figure 4. Because of phase inverter 201, the inputs to keyers 102 and 202 are 180 degrees out of phase with respect to each other, as shown by curves 302 and 402 respectively. Keyers 102 and 202 are so constructed that, upon each positive swing of sine wave voltage applied thereto, they generate a sharp pulse of positive voltage. Hence, the pulse inputs to transmitters 103 and 203 will be 180 degrees phase-displaced with respect to each other, as shown by curves 303 and 403; with the result that said transmitters will alternately operate to transmit wave trains through antennas 26 and 24 respectively.

Sweep current generators 105 and 205 are so constructed that they will generate a positive saw-tooth current on each positive swing of sine-wave voltage from oscillator 10. Because of phase inverter 207, said sweep current generators will generate saw-tooth currents which are 180 degrees phase-displaced with respect to each other, as shown by curves 305 and 405. Hence beam deflecting magnets 106 and 206 will alternately predominate over each other and alternately deflect the beam in opposite directions in synchronism with the alternate transmission through the oppositely directed antennas. By adjustment of phaser 100, the beginning of saw-tooth waves 305 and 405 can be made to exactly coincide with the generation of pulses 303 and 403 respectively. For an alternative circuit for providing an electronically reversible sweep, reference is made to the Huber and Gindoff application, supra.

It will be seen that the system in Figure 3 will operate in a manner similar to that in Figure 1, with the extra advantage of requiring no switching in the high frequency transmitter circuits nor in the high current beam deflecting circuits. Although two transmitter and keyer channels are required, their combined power output need be no greater than that of the single keyer and transmitter channel of Figure 1. Moreover, if one transmitter channel fails, the other will still function, thus providing an additional safeguard against operational failures.

In each of the above described circuits, the effective scanning speed can be further increased by using a larger number of antennas. Thus, by using four antennas having lobes displaced 90 degrees with respect to each other, and a cathode-ray indicator having two sets of beam deflecting magnets rotating in synchronism with said antennas, one set of magnets deflecting the beam 90 degrees with respect to that of the other set, and by synchronously switching each antenna and the corresponding direction of beam deflection, the effective scanning speed can be quadrupled.

Although the invention has been particularly described as applied to a P. P. I. system, it is equally applicable to composite indication systems using other systems of coordinates. Moreover, the invention is equally applicable to object location systems using acoustic waves in air or water. The circuits described above can be used with acoustic wave systems, except that directional sound transducers will be used instead of the electromagnetic wave transducers 24 and 26 and the frequencies involved are much lower.

The term "echo" as used herein is not to be restricted to signals which are reflected or passively reradiated by a body. This term is also used to signify any automatic response to a signal, e. g. that obtained by means of a normally inoperative transmitter, located on said body, and which, when keyed by a pulse transmitted toward said body, automatically functions to send an answering pulse, either on the same frequency as said transmitted pulse or on a different frequency.

While there have been described what are at present considered preferred embodiments of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. The method of object location which includes the steps of intermittently transmitting from a point pulses of wave energy and receiving echoes at said point from objects in the path of said transmission, generating a narrow indicating beam, using said echoes to control said beam, alternately localizing said transmission and reception along at least two sectors oppositely extending from said point, the angular width of each sector being a minor fraction of the angular spacing between said sectors, alternately displacing said beam along opposite directions in synchronism with said alternate localization, rotating in unison the effective directions of said sectors of reception, and synchronously therewith rotating said directions of beam displacement.

2. In the operation of an object location system comprising means for intermittently transmitting pulses of wave energy toward objects to be located, at least two wave pickup devices respectively having unidirectional oppositely extending response lobes, a wave translating means, an indicator controlled by said wave tranlating means, said indicator comprising means to generate an electron beam, a fluorescent screen responsive to said beam, means to deflect said beam in opposite directions from its normal position in a plane, and means to shift the position of said plane; the method of indicating on said screen the direction of incidence of echoes from said objects comprising the steps of continuously rotating said pickup devices in unison and synchronously therewith shifting the plane of deflection of said beam, alternately impressing the energy of said pickup devices upon the input of said wave translating means and simultaneously therewith alternately deflecting said beam in opposite directions in said plane, the rate of said rotation being a minor fraction of the rate of said alternate impression of energy.

3. The method of pulse-echo object location which includes the steps generating spaced pulses of wave energy, transmitting alternate pulses and receiving echoes thereof along oppositely directed sectors, generating a narrow beam of electrons, using said echoes to control the intensity of said beam, alternately displacing said beam in opposite directions in synchronism with said alternate transmission, rotating in unison the effective directions of said sectors and synchronously therewith rotating the directions of said beam displacements to indicate the distance and direction of said object.

4. A pulse-echo object location system comprising at least a pair of rotatable directional wave transducers having oppositely directed response lobes, means for transmitting pulses of wave energy and means for receiving echoes of said pulses through said wave transducers, an indicator having means for generating a sharp indicating beam, means excited by the output of said receiving means to control said beam, and rotatable means to deflect said beam in opposite directions, means to rotate said wave transducers and synchronously therewith rotate said beam deflecting means, whereby the plane of beam deflection is rotated in synchronism with the effective directions of said lobes, and switching means to alternately apply the output of said wave transducers to said receiving means and to simultaneously reverse the direction of beam deflection.

5. A radio frequency pulse-echo object location system comprising at least a pair of rotatable antennas having oppositely directed response lobes, means for transmitting pulses of radio energy and means for receiving echoes of said pulses through said antennas, a cathode ray tube having means for generating a sharp beam of electrons, beam intensity control means excited by the output of said receiving means, a fluorescent screen excited by said beam, and rotatable means to deflect said beam in opposite directions from the axis of said tube, means to generate a saw-tooth wave of energy in synchronism with the transmission of each pulse, said beam deflecting means being excited by said saw-tooth wave, means to rotate said antennas and synchronously therewith rotate said beam deflecting means, whereby the plane of beam deflection is rotated in synchronism with the effective directions of the antenna lobes, and switching means to alternately apply the output of said antennas to said receiving means and to simultaneously reverse the polarity of said saw-tooth wave whereby the direction of beam deflection always corresponds to the direction of the lobe of the antenna connected to said receiver.

6. A radio frequency pulse-echo object location system comprising means for generating pulses of radio energy, means for transmitting alternate pulses in opposite directions and means for receiving echoes of said pulses, a cathode ray tube having means for generating a sharp beam of electrons, beam intensity control means excited by the output of said receiving means, a fluorescent screen excited by said beam, and rotatable means to deflect said beam in opposite directions from the axis of said tube, means to generate a saw-tooth wave of energy in synchronism with the transmission of each pulse, said beam deflecting means being excited by said saw-tooth wave, means to rotate said directions of transmission and synchronously therewith rotate said deflecting means, and means to alternately reverse the direction of beam deflection in synchronism with said alternate transmission.

7. A sector scanning system comprising at least a pair of rotatable wave responsive devices having angularly spaced response lobes, a wave translating means, an indicator having means for generating a sharp indicating beam, beam intensity control means excited by the output of said translating means, an indicating screen upon which said beam is directed, and means to linearly deflect said beam, means to successively rotate said devices through said sector and synchronously therewith rotate the line of beam deflection, means to successively connect the output of said wave responsive devices to the input of said wave translating means as said devices scan said sector and to simultaneously so control the said beam deflection that it always indicates the direction of the lobe of the device scanning said sector.

8. A radio frequency sector scanning system comprising at least a pair of rotatable antennas having unidirectional response lobes one of which extends at a predetermined angle to the other, a receiver, a cathode ray tube having means for generating a sharp beam of electrons, beam intensity control means excited by the output of said receiver, a fluorescent screen excited by said beam, and rotatable means to deflect said beam, means to successively rotate said antennas through a sector to be scanned and synchronously therewith rotate said beam deflecting means, and switching means to successively apply the output of said antennas to said receiver as they rotate through said sector and to simultaneously so control the direction of beam deflection that it always corresponds to the direction of the lobe of the antenna scanning said sector.

9. A radio frequency pulse-echo sector scanning system comprising at least a pair of rotatable antennas having oppositely directed response lobes, means for transmitting pulses of radio energy through said sector and means for receiving echoes of said pulses, a cathode ray tube having means for generating a sharp beam of electrons, beam intensity control means excited by the output of said receiving means, a fluorescent screen excited by said beam, and rotatable means to deflect said beam in opposite directions from the axis of said tube, means to generate a saw-tooth wave of energy in synchronism with the transmission of each pulse, said beam deflecting means being excited by said saw-tooth wave, means to successively rotate said antennas through said sector and synchronously therewith rotate said beam deflecting means, whereby the plane of beam deflection is rotated in synchronism with the effective directions of the antenna lobes, and switching means to successively apply the output of said antennas to said receiving means as said antennas scan said sector and to simultaneously so control the polarity of said saw-tooth wave that the direction of beam deflection always corresponds to the direction of the lobe of the antenna scanning said sector.

10. A radio pulse-echo object detection system comprising a pair of transmitters, a directional antenna connected to each transmitter, the respective lobe axes of said antennas extending from a given point at a fixed angle to each other, means to alternately pulse said transmitters, and means to simultaneously rotate the effective directions of said lobe axes relative to said point.

11. A radio pulse-echo object detection transmitting system comprising a pair of transmitters, a directional antenna connected to each transmitter, the respective lobe axes of said antennas extending from a given point in opposite directions, means to alternately pulse said transmitters, and means to continuously rotate the effective directions of said lobe axes relative to said point.

12. The method of object location which comprises the steps of transmitting pulses of wave energy and receiving echoes thereof, alternately localizing said transmission and reception along opposite directions from a point, continuously rotating said directions, generating a narrow cathode-ray indicating beam, controlling the intensity of said beam by means of said echoes, deflecting said beam in timed relation with said pulse transmission to provide a linear time base, and rotating the plane of deflection of said beam to rotate said time base in synchronism with changes in direction of said transmission and reception in such manner that the instantaneous angle of said time base with respect to a predetermined datum position always corresponds to the instantaneous direction of said transmission and reception.

BENJAMIN FOX.

REFERENCES CITED

The following references are of record in the file of this patent:

UNITED STATES PATENTS

| Number | Name | Date |
|---|---|---|
| 2,176,469 | Moueix | Oct. 17, 1939 |
| 2,189,549 | Hershberger | Feb. 6, 1940 |
| 2,205,560 | Herzog | June 25, 1940 |
| 2,403,728 | Loughren | July 9, 1946 |
| 2,419,205 | Feldman | Apr. 22, 1947 |
| 2,425,330 | Kenyon | Aug. 12, 1947 |
| 2,426,654 | White | Sept. 2, 1947 |
| 2,432,101 | Shepherd | Dec. 9, 1947 |

FOREIGN PATENTS

| Number | Country | Date |
|---|---|---|
| 520,778 | Great Britain | May 3, 1940 |
| 542,634 | Great Britain | Jan. 12, 1942 |
| 107,467 | Australia | May 17, 1939 |